United States Patent [19]

Insolio

[11] 4,090,420
[45] May 23, 1978

[54] GLASS BREAKING PLIERS

[75] Inventor: Thomas A. Insolio, Bristol, Conn.

[73] Assignee: The Fletcher-Terry Company, Farmington, Conn.

[21] Appl. No.: 752,474

[22] Filed: Dec. 20, 1976

Related U.S. Application Data

[63] Continuation-in-part of Ser. No. 623,823, Oct. 20, 1975, abandoned.

[51] Int. Cl.² .............................................. B25B 7/00
[52] U.S. Cl. .................................................... 81/5.1 A
[58] Field of Search ............... 81/5.1 R, 5.1 A, 426, 81/427, 428, 415, 416, 417, 418, 420, 300, 421, 423, 422; 30/345, 3 R

[56] References Cited

U.S. PATENT DOCUMENTS

| 1,915,154 | 6/1933 | Schebeko | 81/416 |
| 2,736,218 | 2/1956 | Atkeson | 81/5.1 R |
| 3,161,085 | 12/1964 | Pratt | 81/415 X |
| 3,203,221 | 8/1965 | Conner | 81/415 |
| 3,675,359 | 7/1972 | Ohno | 81/415 |

*Primary Examiner*—James L. Jones, Jr.
*Assistant Examiner*—Roscoe V. Parker, Jr.
*Attorney, Agent, or Firm*—McCormick, Paulding & Huber

[57] ABSTRACT

Two plier elements are pivotally connected so that squeezing the handles together clamps the jaws against a glass sheet adjacent a score line. The actual clamping force is limited because the handles are made from a yieldable plastic such that the handles actually touch one another, preventing a predetermined clamping force from being exceeded. The jaws and handles are molded integrally in each plier element, and metal inserts are provided for the jaws.

10 Claims, 11 Drawing Figures

GLASS BREAKING PLIERS

CROSS REFERENCE TO RELATED APPLICATION

This application is a continuation-in-part application of Ser. No. 623,823 filed on Oct. 20, 1975 by the applicant and now abandoned.

SUMMARY OF THE INVENTION

This invention relates generally to glass breaking pliers of the type adapted for breaking scored glass sheet either along or up to a line of score. The former type of breaker pliers are sometimes referred to as cut running pliers, and the latter type are sometimes referred to as nipping pliers.

The object of the present invention is to provide a unique handle construction for both types of pliers, such that the user can only exert a predetermined maximum designated squeezing force on the handles in order to avoid the propensity for inadvertent crushing of the glass sheet as a result of applying excessive squeezing forces to the plier handles.

The general object of the present invention is accomplished by forming the handles and jaws of each of the two plier elements from a resilient plastic material such that these handles bend toward one another in response to the manually applied squeezing force and ultimately engage one another adjacent their free end portions when a desired clamping force has been reached at the jaws. This clamping force at the jaws corresponds to a predetermined squeezing force at the plier handles, and the presently preferred material from which these yieldable elements are made is a high strength thermoplastic such as polycarbonate or nylon, filled to approximately 30% by weight with oriented fibers of glass or other high tensile strength material. In an alternative embodiment the plier elements are identical to one another, and have jaws with metal inserts removably mounted thereto.

DETAILED DESCRIPTION OF PREFERRED EMBODIMENT FIGS 1-6

Figure 1:
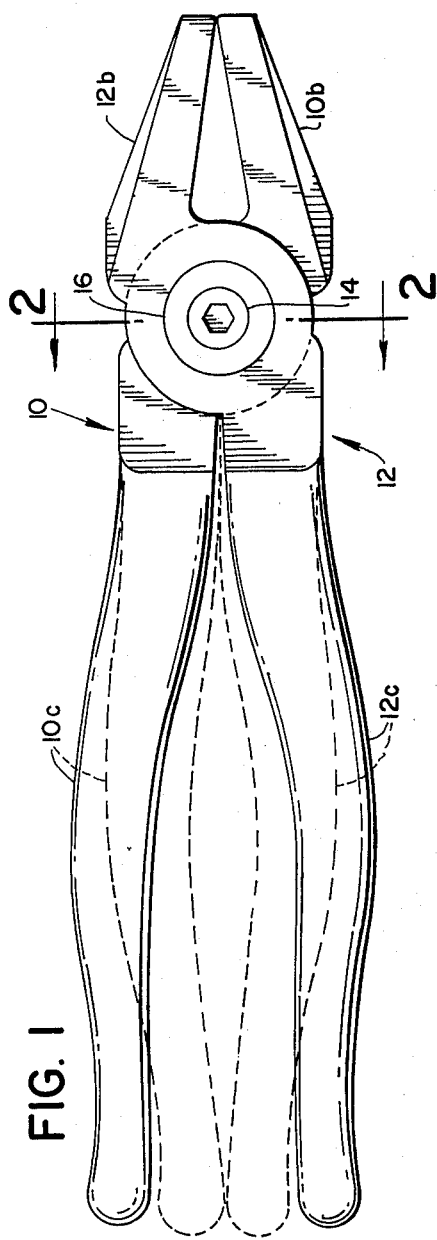
FIG. 1 is a side elevational view of a glass breaking pliers illustrating the handle portions in their normal positions in full lines and in their fully deflected positions in broken lines, the relative position of the jaws being identical for both handle positions.
Figure 2:
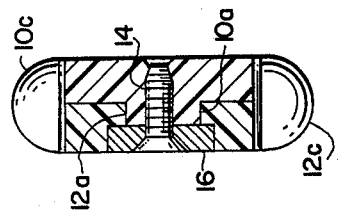
FIG. 2 is a sectional view on the line 2—2 of FIG. 1 illustrating the pivotal connection between the plier elements.

Nipping pliers, or hand held pliers with jaws for clamping short segments of glass to be trimmed on a score line at the edge of a glass sheet are well known in the art. However, such pliers generally are made from steel or a similar metal with the result that the user must be careful not to squeeze the pliers too tightly during this edge trimming process lest he damage the glass sheet. Those familiar with this art will note that only a sufficient squeezing force is required to avoid slipping of the jaws on the glass sheet as the pliers are swung down to break out the glass on the score line. Thus, a two stage process is involved first the user must clamp the glass to be trimmed away so that the blunt nose jaws are adjacent to or slightly outside the score line. The he must swing or pivot the pliers about the tip of the lower jaw directly behind the score line to break the glass. In carrying out the second step one is apt to increase the squeezing force on the handle of the pliers, with the result that the metal jaws may crush the glass and damage the resulting edge at the score line. The nipping pliers to be described avoid this tendency for conventional pliers to crush the glass. The improved pliers are so designed that one cannot increase the squeezing force on the handle during the process of trimming the glass sheet to a score line.

Turning now to the drawings in greater detail, FIGS. 1-5 show nipping pliers incorporating the present invention, and comprising pivotally connected plier elements, 10 and 12. One of said elements 10 defines a pivot opening 10a, best shown in FIG. 2, and the other element 12 defines a pivot post 12a, pivotally received in said opening 10a and axially held therein by means including a screw 14 and a washer 16. The screw is received in a counter sunk opening in the washer 16, and is threadably received in a threaded opening provided for it in the pivot post 12a.

Each of the elements, 10 and 12 defines a jaw 10b and 12b respectively and an elongated handle 10c and 12c respectively each of which handle and jaw portions are integrally connected to an associated pivot defining intermediate portion of said elements so that squeezing the handles 10c and 12c causes a clamping action of the jaws 10b and 12b in a conventional plier action.

Figure 3:
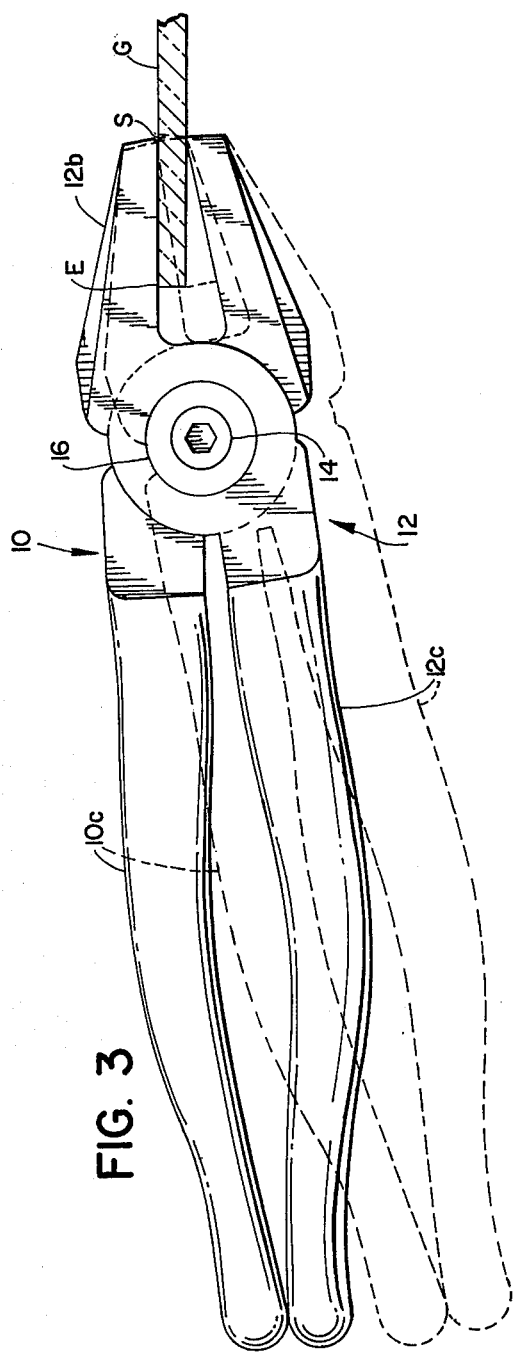
FIG. 3 is a side elevational view of the FIG. 1 pliers illustrating them in two positions, a solid line position with the jaws clamped on a glass sheet to be broken and a broken line position illustrating the pliers following the break out.

However, unlike conventional pliers the handles 10c and 12c are so constructed that when a desired clamping force is achieved at the jaws, the handles will not be capable of exerting any further clamping force because the ends of the handles will have closed on one another as shown in broken lines in FIG. 1, and also in FIG. 3. This unique feature is achieved by fabricating at least one and preferably both plier element portions from a resilient but strong thermoplastic material such as polycarbonate or nylon, and preferably such material includes approximately 30% by weight of relatively long, and longitudinally oriented glass fibers. As so constructed, and with said plier elements pivotally connected to one another as described, it will be apparent that the cross sectional size of the handle can be so chosen that the handle portions 10c and 12c will yield in response to a predetermined squeezing force exerted thereon, with the result that the handle end portions contact one another as shown before an underiraby high clamping force can be reached at the jaws 10b and 12b.

Turning next to a more detailed description of the jaws, 10b and 12b, FIG. 3 shows a glass sheet G clamped therebetween, and the pliers in position (full lines) for exerting a breaking force at the innermost edge E of the glass such that a moment is exerted on the glass sheet to break it at the score line S. The lower jaw 10b has its outer end in position to act as a fulcrum or anvil about which the force of the upper jaw 12b can act. The broken line position shows the position of the pliers as the sheet is broken at the score line S.

Figure 4:
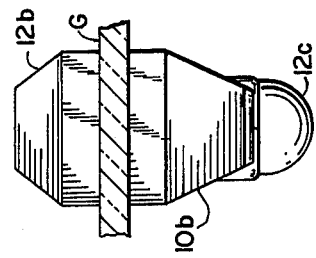
FIG. 4 is an end view of the FIGS. 1-3 pliers showing the glass sheet clamped between the jaws.
Figure 5:
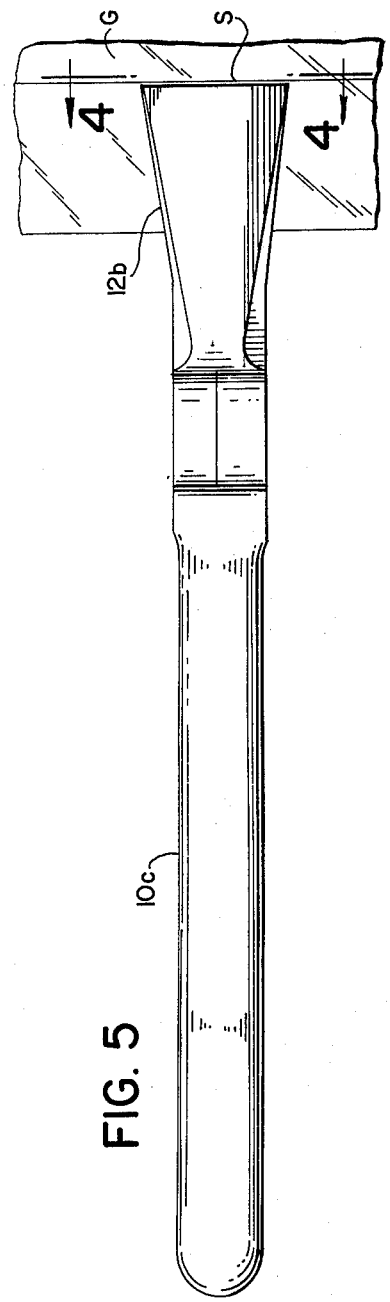
FIG. 5 is a top plan view of the FIG. 1 pliers showing the glass sheet clamped between the jaws and adjacent the score line for achieving a nipping action.

The jaws, 10b and 1b, close on the glass adjacent the score line along a line parallel the axis of the pivot, and both jaws 10b and 12b have flat facing surfaces spaced at least slightly from one another adjacent the said pivot axis to provide clearance for the glass sheet segment to be broken. FIG. 4 shows the line contact between these jaws 10b and 12b and the glass sheet. FIG. 5 shows this line contact to be adjacent the score line S.

DETAILED DESCRIPTION OF FIRST ALTERNATIVE EMBODIMENT FIGS. 7 AND 8

Figure 6:
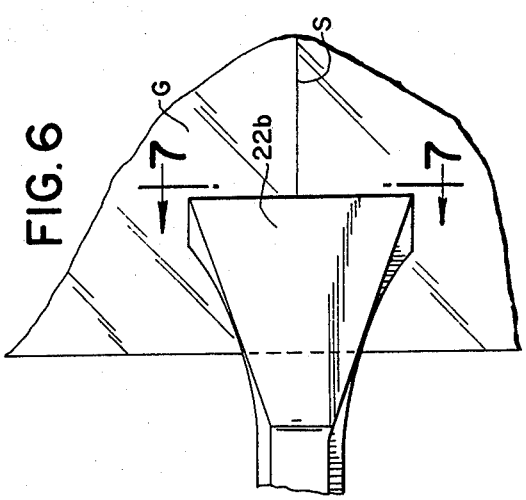
FIG. 6 is a top or plan view of an alternative version for the jaws of a pliers incorporating the present invention, which alternatively constructed jaws are especially adapted for splitting glass along a score line or running the cut from one side of the glass sheet to another.

Glass splitting, or cut running pliers are also known in the art, and as shown in FIG. 6, such pliers are adapted to being applied to one side of the glass sheet G in order to start the splitting action, and to run the cut across the sheet. However, such pliers are generally made from steel or a similar material, with the result that the user must be careful not to squeeze too tightly or he risks crushing the glass before or after running the cut. The pliers to be described, like those described above, avoid this tendency by preventing the user from exerting too high a squeeze force at the handles. The handles (not shown) are identical to those described above, but the jaws, 20b and 22b, are of different configuration than the jaws, 10b and 12b, because the longitudinal axis of the pliers is oriented in line with the score line for the cut running pliers instead of being normal thereto as in the preferred embodiment described hereinabove.

The jaws 20b and 22b are integrally formed on fiber filled plastic plier elements otherwise similar to the plier elements 10 and 12. The upper jaw 22b is the glass breaking jaw, and has a generally concave configuration with spaced lands for engaging the glass on either side of the line of score. The lower, or anvil jaw 20b has a generally flat face but a hard plastic rod insert 24 is mounted in a groove provided in the said flat jaw face to provide a fulcrum behind the score line about which the glass can be broken as suggested in FIGS. 7 and 8.

Figure 7:
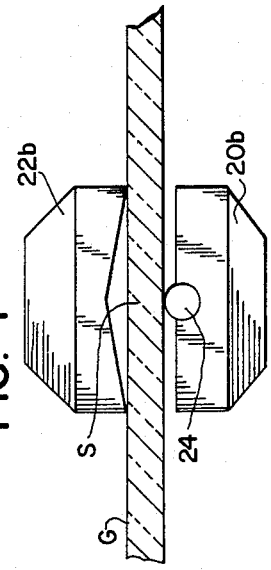
FIG. 7 is an end view of the FIG. 6 pliers showing the jaws in contact with the glass, but before the force limiting action of the handles has been reached.
Figure 8:
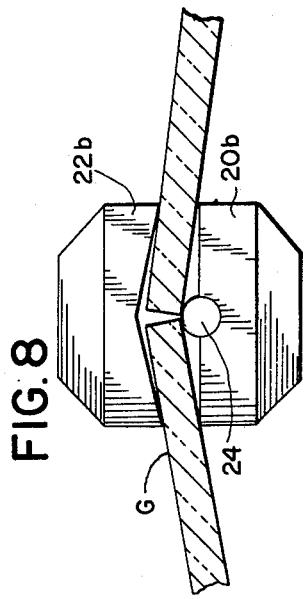
FIG. 8 is a view similar to that of FIG. 7 but shows the sheet severed at the score line.

As so constructed and arranged the cut running pliers of FIGS. 6–8 may be squeezed until the handles touch one another, as suggested in FIG. 1 with reference to the preferred embodiment. The cut can thence run along the score line and even if further squeezing force is inadvertently applied to the handles no damage to the glass will result.

DETAILED DESCRIPTION OF SECOND ALTERNATIVE EMBODIMENT FIGS. 9 – 11

Figure 9:
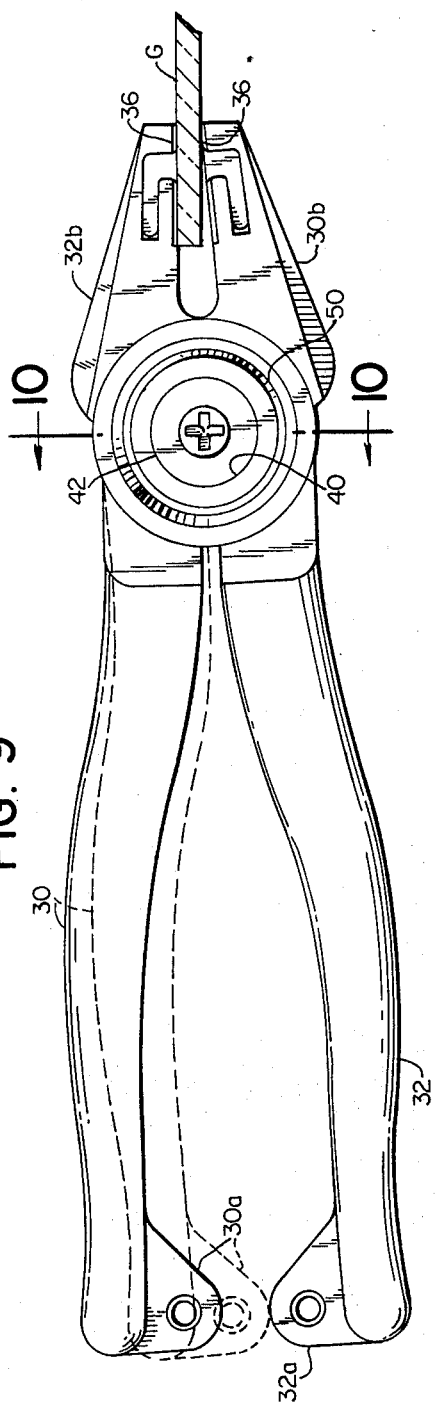
FIG. 9 is a side elevational view of a second alternative embodiment for pliers incorporating the present invention, the broken line position illustrating the relationship of the handles when the jaws are clamped on a glass sheet to be broken.
Figure 11:
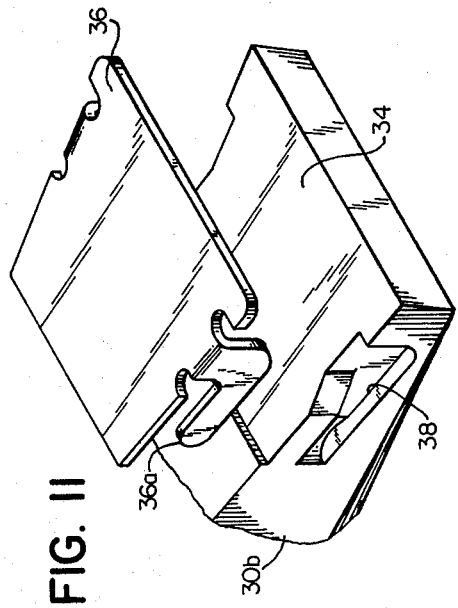
FIG. 11 is a perspective view of one jaw with a metal insert provided in exploded relationship thereto.
Figure 10:
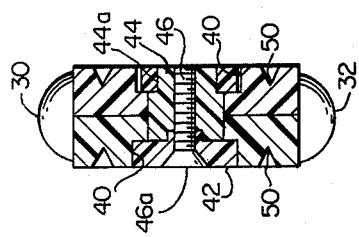
FIG. 10 is a sectional view on line 10—10 of FIG. 9 illustrating the pivotal connection in the alternative embodiment.

Turning next to the pliers illustrated in FIGS. 9–11, two plier elements 30 and 32 are pivotally connected to one another as best shown in FIG. 10. The plier elements are integrally molded from a plastic material having a relatively high elastic limit (such as polycarbonate or nylon, filled to 30% by weight with oriented glass fibers). These plier elements are identical to one another and each has a land 30a and 32a respectively, defined at the free ends of the handle portions thereof to define the limit position (shown in broken lines) wherein the clamping force at the jaws reaches the predetermined limit described above with reference to the previously described embodiments.

The jaw defining portions, 30b and 32b, of these plier elements define relieved portions 34 which face one another and which are adapted to receive hardened steel jaw inserts 36, 36. Because of the resilient plastic used for these identical plier elements, 30 and 32, the jaws of the pliers shown in FIGS. 1–6 do tend to become worn during periods of extended use, and the improved pliers of FIGS. 9–11 avoid this propensity to wear by the provision of the metal jaw inserts 36, 36. These inserts have depending tangs 36a, 36 for yieldingly engaging undercut recesses 38, 38 in each jaw as best shown in FIG. 11.

FIG. 10 shows the pivotal connection between the identical plier elements, 30 and 32, both of said plier elements having portions intermediate the handle and jaw defining portions thereof and which intermediate portions define stepped openings 40, 40 for receiving an annular washer element 42 and an annular nut element 44. The element 44 has an internally threaded axial opening for receiving a short screw 46. This nut element 44 is stepped so as to be received in the stepped pivot opening 40 of the plier element 30, and the inner end of this nut element extends axially into the other plier element opening as best shown in FIG. 10.

Still with reference to the pivotal connection between the identically constructed plier elements 30 and 32, the nut element 44 has two diametrically opposed tool receiving openings 44a, 44a and the screw 46 has a head 46a with a socket (best shown in FIG. 9) to permit assembly of these parts so that the pivotal plier action can be achieved, and so that the forces in these plier elements can be efficiently reacted by the relatively large diameter pivot post defined by the elements 42 and 44.

It is a characteristic of the thermoplastic used for these plier elements that these members are subjected to considerable bending stress in the area of the pivot connection, and this because of the requirement that these members or elements be sufficiently strained (deflected) so that the ends of the handles come together. The stress/strain relationship for the thermoplastic glass filled polycarbonate used is such that these strains (deflections) are at or near the elastic limit for this material. In order to maximize the yield strength of the material, especially in the area of the pivot connection, it has been found advantageous to provide a recess 50 in the outer surface of these plier elements in concentric relationship to the pivot axis defined by the elements 42 and 44.

These recessed ring shaped areas 50, 50 in the plier elements 30 and 32, increase the surface area of the material in these highly stressed areas. It is thought that this fact may lead to the increased capability of the disclosed pliers to react the forces imposed in this area. The fact that this capability has been achieved is known, but the reasons therefore are admittedly not fully understood, at least by applicant.

I claim:

1. Glass breaking pliers comprising plier elements having jaw portions and handle portions, means pivotally connecting intermediate portions of said plier elements to one another so that squeezing said handle portions causes said jaw portions to grip a glass sheet therebetween, each plier element handle portion being fabricated from a resilient material having a modulus of elasticity such that said handle portions will bend toward one another as the manually applied squeezing force is increased, said handle portions having abutment means on the outer ends adapted to abut one another when said force reaches a predetermined limit whereby the crushing force of the jaws on the glass is correspondingly limited.

2. The glass breaking pliers of claim 1 wherein each of said plier elements comprises an integrally molded member fabricated from a fiber reinforced synthetic plastic material.

3. The glass breaking pliers of claim 2 wherein said jaw defining portions have closed positions such that the end portions thereof close on a straight line parallel the axis of said pivotal connection means, and said jaws having flat facing surfaces spaced at least slightly further from one another adjacent said pivot axis than at said end portions when said jaws are closed.

4. The glass breaking pliers of claim 2 wherein said jaw defining portions of said plier elements are so shaped with respect to one another that one comprises an anvil jaw and the other a glass breaking jaw, said anvil jaw having a relatively hard plastic rod inserted in a groove provided centrally thereof and perpendicular to said pivot axis, said breaker jaw having a generally concave configuration to cause the glass to bend and break about said anvil defining rod.

5. The glass breaking pliers of claim 2 wherein said synthetic plastic material comprises a glass fiber reinforced thermoplastic having a stress/strain relationship and elastic modulus at least approximately equal to that of polycarbonate filled to 30% by weight with oriented glass fibers.

6. The glass breaking pliers of claim 5 wherein said plier elements are identical to one another, and wherein each has a land adjacent the free end of the handle portion, said lands abutting one another to limit the crushing force at the jaws.

7. The glass breaking pliers of claim 5 wherein said jaw portions include glass engaging inserts of material harder than said synthetic fiber filled thermoplastic, each such insert having a flat glass engaging surface and depending tangs for releasably engaging said synthetic jaw portions.

8. The glass breaking pliers of claim 7 wherein said jaw inserts are of hardened steel to resist the abrasiveness of the glass.

9. The glass breaking pliers of claim 5 wherein said intermediate portions of said plier elements define outer surfaces surrounding said pivotally connecting means, said surfaces of said intermediate portions of said plier elements defining a recessed annular groove spaced in concentric relationship to the openings provided for said means pivotally connecting said plier elements.

10. The glass breaking pliers of claim 5 wherein said means pivotally connecting said plier elements comprises two annular elements rotatably received in stepped openings provided in said intermediate portions, and fastener means extending axially through aligned openings in said annular elements, one of said annular elements cooperating with said fastener means to hold said plier elements in assembled relationship.

* * * * *